(12) United States Patent
Anderson

(10) Patent No.: US 6,651,955 B2
(45) Date of Patent: Nov. 25, 2003

(54) ELASTOMERIC VALVE, AND METHODS

(75) Inventor: Ronald R. Anderson, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 90 days.

(21) Appl. No.: 09/919,169

(22) Filed: Jul. 30, 2001

(65) Prior Publication Data

US 2003/0020040 A1 Jan. 30, 2003

(51) Int. Cl.[7] ............................................. F16K 51/00
(52) U.S. Cl. ..................................... 251/149.1; 604/249
(58) Field of Search .......................... 251/149.6, 149.1; 604/249, 246, 905, 167.03, 167.04, 236, 237, 256

(56) References Cited

U.S. PATENT DOCUMENTS

| | | | |
|---|---|---|---|
| 4,063,708 A | * 12/1977 | Smith | 251/149.6 |
| 4,978,714 A | * 12/1990 | Bayan et al. | 525/69 |
| 5,046,645 A | * 9/1991 | Hagan et al. | 251/149.6 |
| 5,056,756 A | * 10/1991 | Norkey et al. | 251/149.6 |
| 5,269,763 A | * 12/1993 | Boehmer et al. | 251/149.1 |
| 5,295,658 A | 3/1994 | Atkinson et al. | |
| 5,360,413 A | * 11/1994 | Leason et al. | 604/249 |
| 5,544,858 A | * 8/1996 | Rogers et al. | 251/149.6 |
| 5,578,059 A | * 11/1996 | Patzer | 604/249 |
| 5,639,810 A | * 6/1997 | Smith et al. | 604/88 |
| 5,647,398 A | * 7/1997 | Giesler | 251/359 |
| 5,738,144 A | * 4/1998 | Rogers | 251/149.6 |
| 5,749,861 A | * 5/1998 | Guala et al. | 604/249 |
| 5,950,986 A | * 9/1999 | Daugherty et al. | 251/149.6 |
| 5,971,024 A | 10/1999 | Penny | |
| 6,149,129 A | * 11/2000 | Harris et al. | 251/149.1 |

FOREIGN PATENT DOCUMENTS

| | | |
|---|---|---|
| EP | 1000753 A1 | 5/2000 |
| EP | 1092546 A2 | 4/2001 |

* cited by examiner

*Primary Examiner*—Gene Mancene
*Assistant Examiner*—John Bastianelli
(74) *Attorney, Agent, or Firm*—Larry Baker

(57) ABSTRACT

Embodiments of the present invention comprise one-part elastomeric valves which are manipulated after molding to preload the valve seal. The valves maintain positive seal until a fluidic pressure or mechanical force is applied to open the valve. The valves return to a closed state after the pressure or force is removed.

21 Claims, 4 Drawing Sheets

ELASTOMERIC VALVE, AND METHODS

TECHNICAL FIELD OF THE INVENTION

The present invention relates generally to valves for controlling fluid flow, and more particularly to valves formed of an elastomeric material.

BACKGROUND OF THE INVENTION

Fluidic valves are well known in the art, and are utilized in a wide range of applications. For example, fluidic valves are often utilized to control ink flow in printer systems. Fluidic valves may range from simple, inexpensive one-part structures to complex assemblies.

Inexpensive valves may be simple non-loaded structures or slightly more complex interface-reliant valves. The non-loaded type, such as "duckbill" valves, are prone to leaking at small pressure differences across the valve. The interface-reliant type, such as "umbrella" valves, require a sealing surface other than the valve itself, which requires additional components to make the seal with mating components. Another interface-reliant valve is the slit septum type, in which a needle penetrates a normally closed septum to establish fluid flow. This type of valve is often prone to leaks and requires a high degree of alignment between the needle and valve. Assuring precise alignment often adds cost to a fluid system.

Conventional fluidic interconnect valves which have preloaded seals are typically multi-part. The added complexity may include a ball, a spring, or a flap, or other components. Where a large number of valves is required in a fluid system, such as in a printer system with multiple ink colors, the added complexity of such valves may be prohibitively expensive.

There is therefore a need for fluidic valves that provide robust fluid seals at low cost.

SUMMARY OF THE INVENTION

Embodiments of the present invention comprise one-part elastomeric valves which are manipulated after molding to preload the valve seal. The valves maintain positive seal until a fluidic pressure or mechanical force is applied to open the valve. The valves return to a closed state after the pressure or force is removed.

Other aspects and advantages of the present invention will become apparent from the following detailed description, taken in conjunction with the accompanying drawings, illustrating by way of example the principles of the invention.

DESCRIPTION OF THE PREFERRED EMBODIMENT

Figure 1:
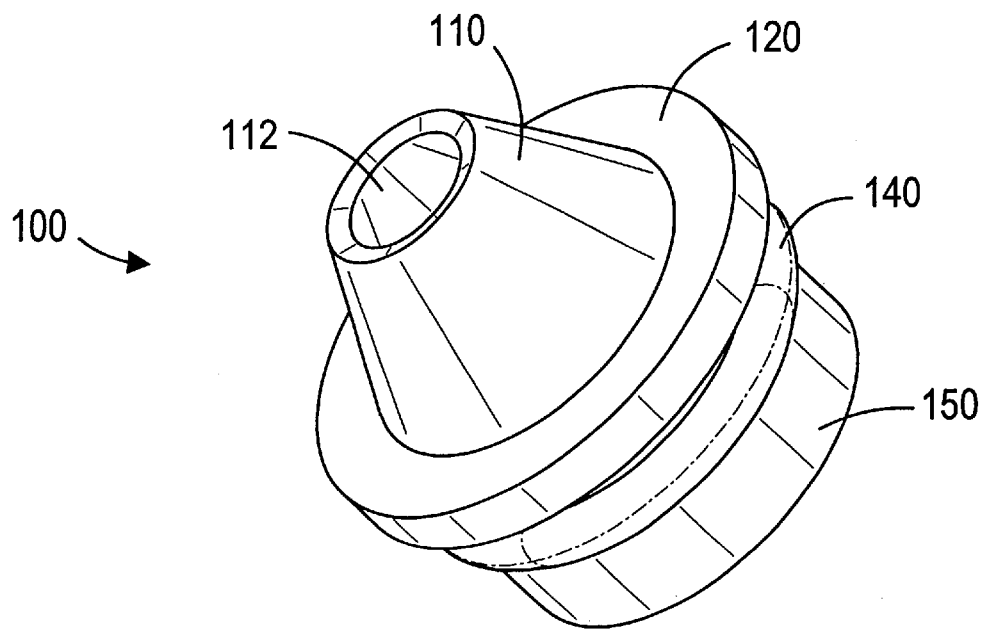
FIG. 1 is a front perspective view of an exemplary embodiment of the valve of the present invention after molding, but prior to preloading.
Figure 2:
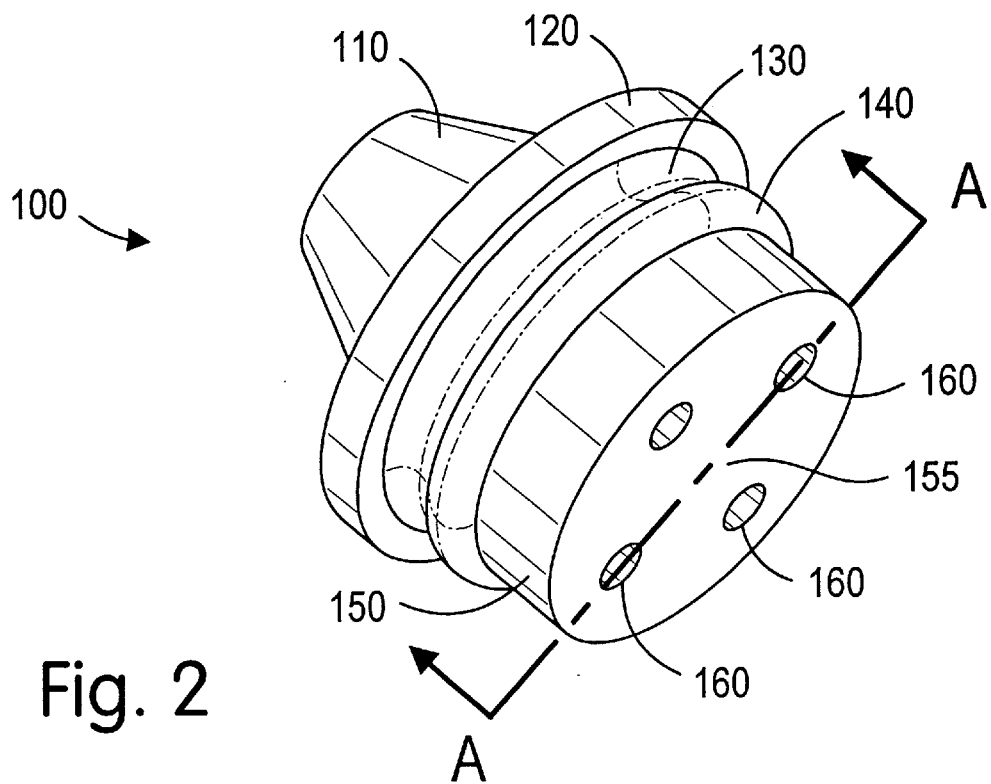
FIG. 2 is a rear perspective view of an exemplary embodiment of the valve of the present invention after molding, but prior to preloading.

FIGS. 1 and 2 are front and rear perspective views, respectively, of an exemplary embodiment of the valve 100 of the present invention, shown before the valve has been manipulated for preloading. The valve is preferably integrally molded of a low durometer elastometer. The valve comprises a lip portion 110; a first mounting seal 120; a mounting groove 130; a second mounting seal 140; and a rear portion 150 including a plurality of fluid passages 160. The rear portion also includes a stopper member 155, which is further discussed with respect to FIG. 3 below. The lip portion 110 of the valve is formed as a truncated cone with an orifice 112; the lip is later manipulated to provide a preloaded seal, as also discussed below.

The preferred material for forming the valve is an EPDM (ethylene polypropylene diene monomer)/butyl blend with a durometer of approximately 50–70. Other resilient elastomeric materials, such as silicone rubber, may also be used. The material characteristics will vary with the specific design and intended application of the valve.

Figure 3:
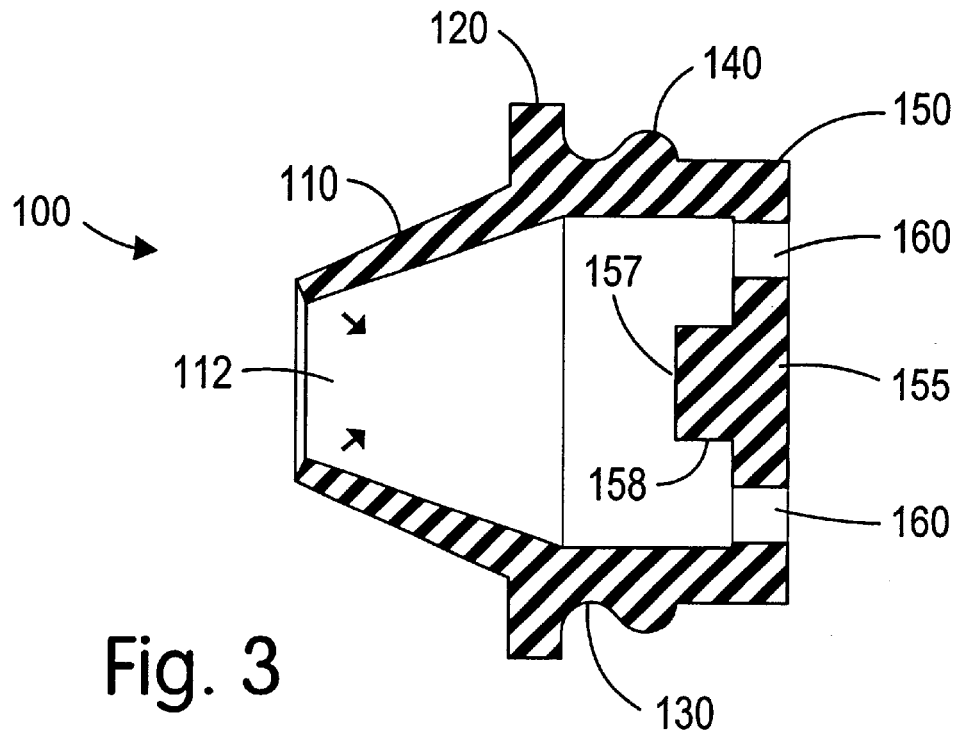
FIG. 3 is a cross sectional view of an exemplary embodiment of the valve of the present invention along line A—A of FIG. 2.

FIG. 3 is a cross sectional view of an exemplary embodiment of the valve of the present invention along line A—A of FIG. 2. Stopper member 155 extends forward with a cylindrical wall 158 and a contact face 157. To form the completed valve, the conical lip 110 is pushed into the orifice 112 until the inverted lip forms a seal with the cylindrical wall 158 of the stopper, as shown in FIG. 4.

Figure 4:
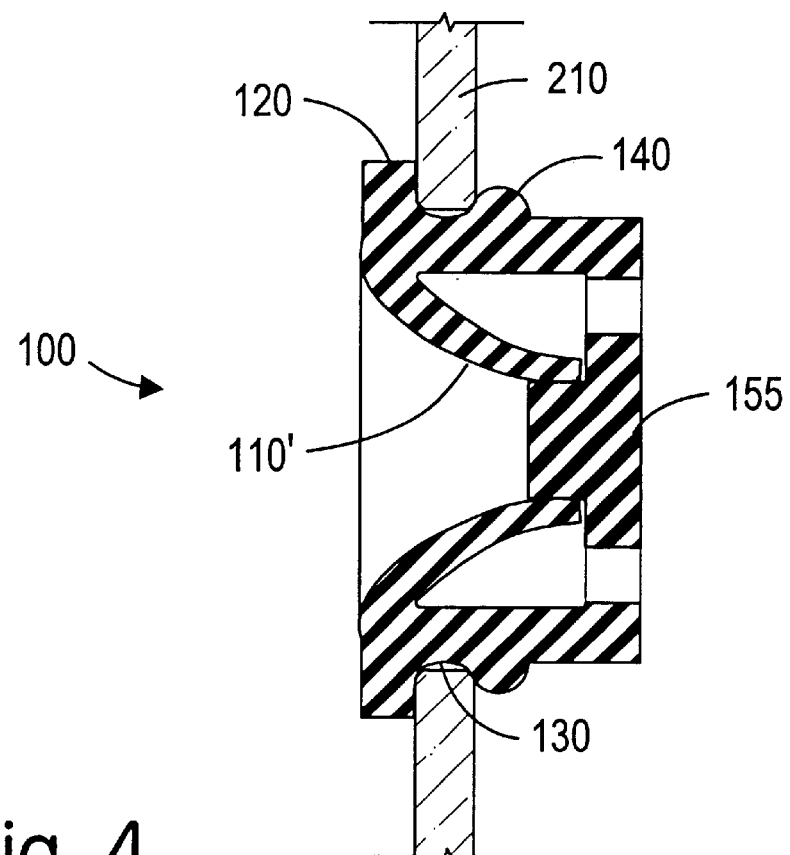
FIG. 4 is a cross sectional view of an exemplary embodiment of the valve of the present invention after preloading and installation.

FIG. 4 is a cross sectional view of an exemplary embodiment of the valve of the present invention after preloading and installation. For installation of the valve into a fluid system, such as an ink delivery system in a printer, the exemplary embodiment of the valve is inserted into a round opening formed in a flat surface 210, such as the wall of an ink container. The first and second mounting seals 120 and 140 contact the two sides of the flat surface 210, providing fluid tight seals.

Figure 5:
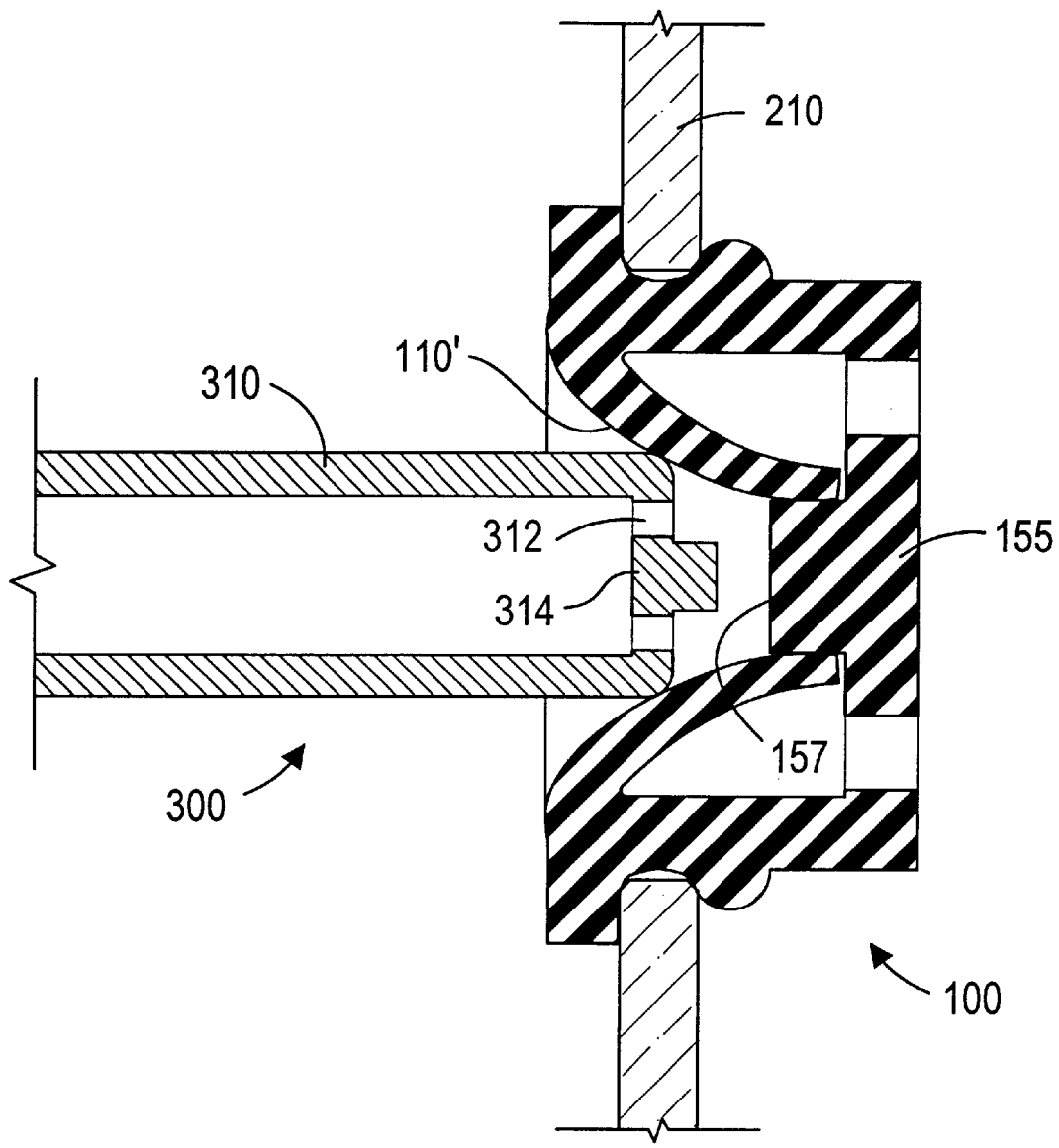
FIG. 5 is a cross sectional view of an exemplary embodiment of the valve of the present invention showing a needle engaging the valve and sealing to the valve lip.

FIG. 5 is a cross sectional view of an exemplary embodiment of the valve of the present invention showing a hollow needle 310 beginning to engaging the valve and sealing to the valve lip 110'. The hollow needle may typically be made of molded plastic, with one or more openings 312 at the tip for fluid flow, and a protuberance 314 for engaging the contact face 157 of the valve.

An advantage of the present valve design over previous "slit septum" designs is that it enables the use of relatively inexpensive plastic needles. With slit septums, the needle must be very slender, and therefore typically made of metal. With the valve of the present invention, the need to minimize the diameter of the needle diameter is obviated, and less expensive plastic needles may be employed. The valve of the present invention thus allows an overall reduction is system cost.

Figure 6:
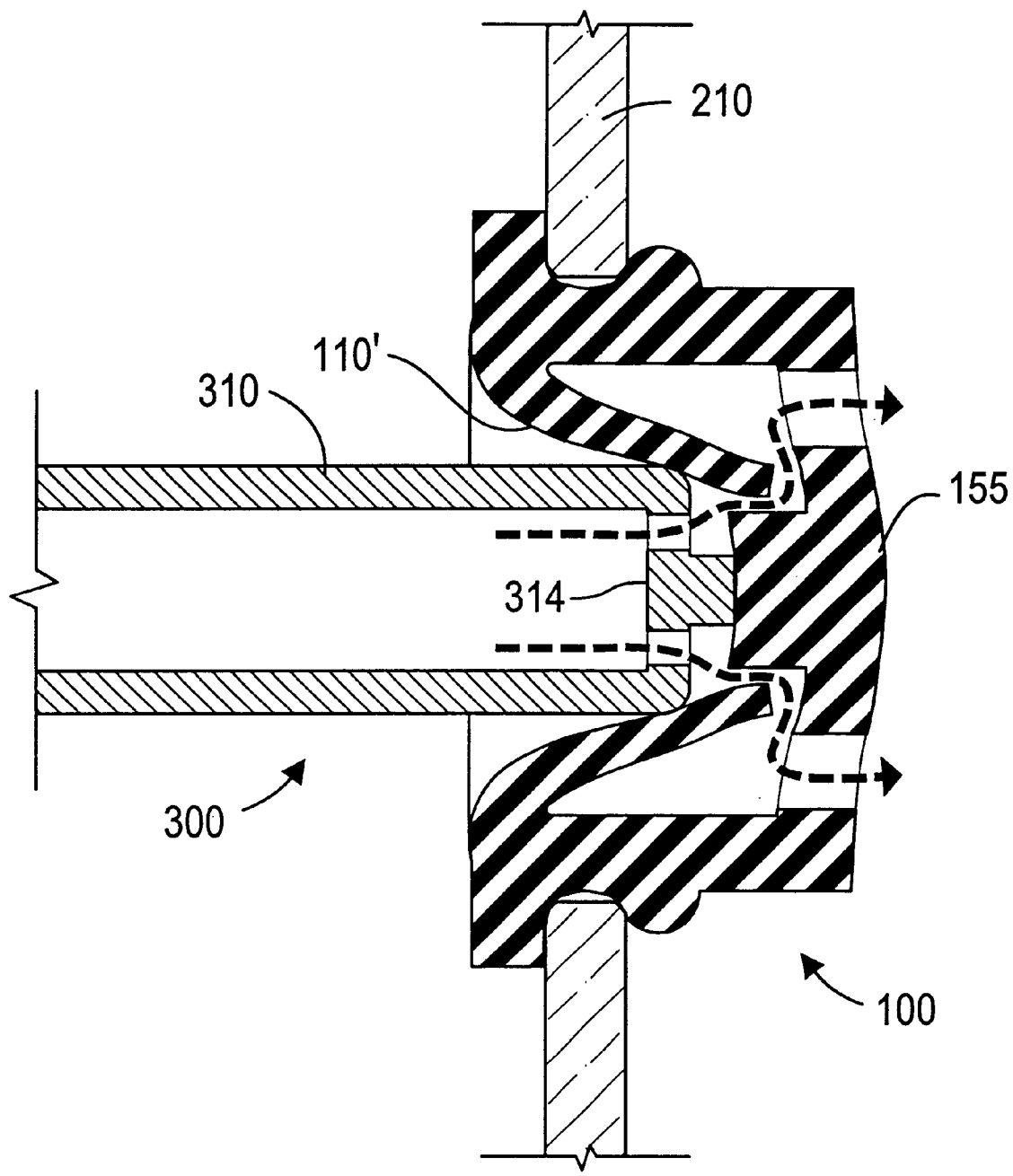
FIG. 6 is a cross sectional view of an exemplary embodiment of the valve of the present invention showing a needle opening the valve.

FIG. 6 is a cross sectional view of an exemplary embodiment of the valve of the present invention showing a needle 300 opening the valve 100. The needle urges the valve lips 110' apart and resiliently forces the valve stopper 155 back, creating fluid passageways around the stopper and through the fluid passageways 160. Removal of the needle closes the valve via the elastomeric rebound properties of the valve parent material.

The valve of the present invention is thus a low cost single component mechanisim which is easy to manufacture and assemble into a fluidic system. A further advantage of the valve of the present invention is the simplicity of installation, resulting in further cost savings.

The above is a detailed description of particular embodiments of the invention. It is recognized that departures from the disclosed embodiments may be within the scope of this invention and that obvious modifications will occur to a person skilled in the art. It is the intent of the applicant that the invention include alternative implementations known in the art that perform the same functions as those disclosed. This specification should not be construed to unduly narrow the full scope of protection to which the invention is entitled.

The corresponding structures, materials, acts, and equivalents of all means or step plus function elements in the claims below are intended to include any structure, material, or acts for performing the functions in combination with other claimed elements as specifically claimed.

What is claimed is:

1. A fluid valve, comprising:
   a main valve portion of a flexible material, the main valve portion substantially forming a tube with an open first end and an open second end;
   a valve stopper member having a substantially circular cross section;
   the open second end of the main valve portion having a substantially circular lip which resiliently engages the circular cross section of the stopper member when the valve is closed, and which may be resiliently urged away from the stopper member to open the valve;
   the fluid valve integrally formed of an elastomeric material.

2. The fluid valve of claim 1, wherein the main valve portion first open end has a first cross section and the main valve portion second open end has a second cross section, the second cross section smaller than the first cross section.

3. The fluid valve of claim 2, wherein the valve may be opened by urging the lip of the main valve portion away from the stopper with a needle positioned inside the tube.

4. The fluid valve of claim 3, wherein the stopper portion is resiliently connected to the main valve portion such that the needle urging the circular lip of the main valve portion away from the stopper may also engage the stopper and push the stopper away from the main portion lip.

5. The fluid valve of claim 1, wherein the elastomeric material is a blend of ethylene polypropylene diene monomer (EPDM) and butyl rubber.

6. A fluid valve, comprising:
   a main valve portion of a flexible material, the main valve portion substantially forming a tube with an open first end and an open second end;
   the open first end having a first cross section and the open second end having a second cross section, the second cross section smaller than the first cross section;
   a valve stopper member having a substantially circular cross section;
   the open second end of the main valve portion having a substantially circular lip which resiliently engages the circular cross section of the stopper member when the valve is closed, and which may be resiliently urged away from the stopper member to open the valve;
   the fluid valve integrally formed of an elastomeric material.

7. The fluid valve of claim 6, wherein the main valve portion is formed with the smaller second end distal from the stopper member, and is subsequently manipulated by folding the smaller end back through larger end to engage the stopper.

8. The fluid valve of claim 6, wherein the valve may be opened by urging the lip of the main valve portion away from the stopper with a needle positioned inside the tube.

9. The fluid valve of claim 8, wherein the stopper portion is resiliently attached to the main valve portion such that the needle urging the circular lip of the main valve portion away from the stopper may also engage the stopper and push the stopper away from the main portion lip.

10. The fluid valve of claim 6, wherein the valve is integrally formed of an elastomeric material.

11. The fluid valve of claim 10, wherein the elastomeric material is a blend of ethylene polypropylene diene monomer (EPDM) and butyl rubber.

12. A fluid valve system, comprising:
   a main valve portion of a flexible material, the main valve portion substantially forming a tube with an open first end and an open second end;
   the open first end having a first cross section and the open second end having a second cross section, the second cross section smaller than the first cross section;
   a valve stopper member having a substantially circular cross section;
   the open second end of the main valve portion having a substantially circular lip which resiliently engages the circular cross section of the stopper member when the valve is closed, and which may be resiliently urged away from the stopper member to open the valve;
   a needle operable to engage the main valve portion and urge the main valve portion away from the stopper;
   the fluid valve integrally formed of an elastomeric material.

13. The fluid valve system of claim 12, wherein the main valve portion is formed with the smaller second end distal from the stopper member, and is subsequently manipulated by folding the smaller end back through larger end to engage the stopper.

14. The fluid valve system of claim 12, wherein the valve may be opened by urging the lip of the main valve portion away from the stopper with the needle positioned inside the tube.

15. The fluid valve system of claim 14, wherein the stopper portion is resiliently attached to the main valve portion such that the needle may also engage the stopper and push the stopper away from the main portion lip.

16. The fluid valve system of claim 12, wherein the valve main portion and stopper are integrally formed of an elastomeric material.

17. The fluid valve system of claim 16, wherein the elastomeric material is a blend of ethylene polypropylene diene monomer (EPDM) and butyl rubber.

18. The fluid valve system of claim 12, wherein the needle has a tip and is hollow to accommodate fluid flow; the tip having a fluid passageway.

19. The fluid valve system of claim 18, wherein the needle is formed of a plastic material.

20. A method of forming a fluid valve, comprising:
   integrally forming a main tube portion and a stopper portion of an elastomeric material, the stopper portion having a circular cross section and the main tube portion having an open first end and an open second end, the open second end having a cross section sized to resiliently engage the circular cross section of the stopper, the valve formed with the open second end distal from the stopper;

manipulating the main tube portion to pass the open second end through the open first end and engage the stopper.

21. The method of forming a fluid valve of claim 20, wherein the elastomeric material is a blend of ethylene polypropylene diene monomer (EPDM) and butyl rubber.

* * * * *